April 4, 1967  H. E. WALKER  3,312,049
GUARD FOR ROTARY LAWN MOWER
Filed Oct. 14, 1964  2 Sheets-Sheet 2

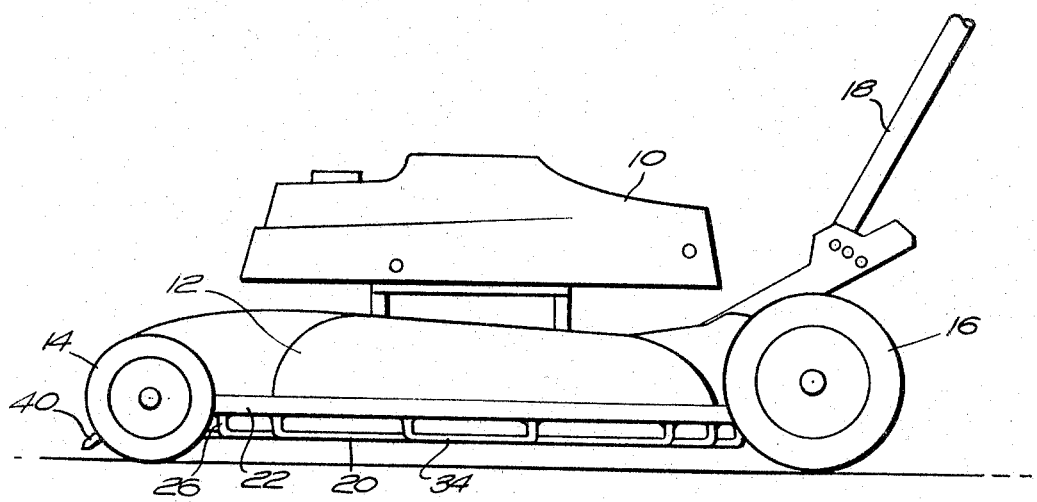
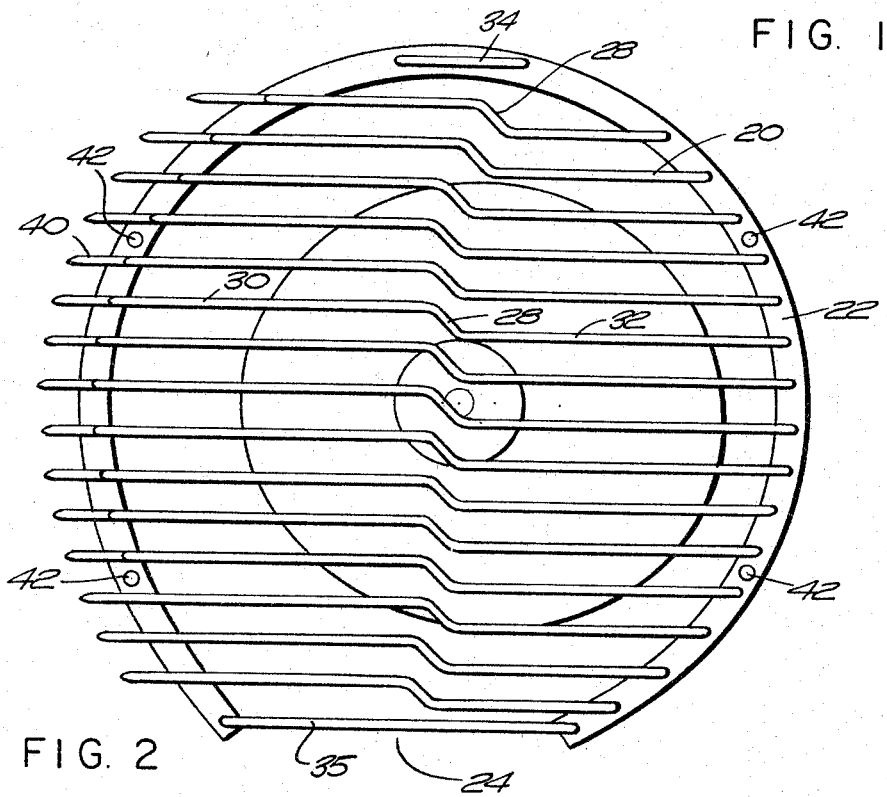

INVENTOR.
HARRY E. WALKER
BY
Morse, Altman & Oates
ATTORNEYS

3,312,049
GUARD FOR ROTARY LAWN MOWER
Harry E. Walker, Rte. 2, Mechanic Falls, Maine 04256
Filed Oct. 14, 1964, Ser. No. 403,890
4 Claims. (Cl. 56—255)

This invention relates to a guard for a power-driven rotary lawn mower of the type having a vertical shaft carrying two or more blades which rotate rapidly in a horizontal plane near the ground on which the mower advances. To be effective in their grass-cutting function, the rotor must be driven at high speed. It thus becomes a source of danger and is responsible for many serious accidents. It is an object of the present invention to provide an effective guard which will materially reduce the danger involved in operating the mower without interfering with its effectiveness in cutting grass on a lawn. For this purpose a series of horizontal bars having a zigzag shape are mounted under the blades, the general direction of the bars being along the direction of movement of the mower when in use.

For a more complete understanding of the invention, reference may be had to the following description thereof, and to the drawings, of which FIGURE 1 is a side elevation of a rotary power lawn mower having a guard embodying the invention;

FIGURE 2 is a bottom plan view of the guard shown in FIGURE 1;

Figure 3:
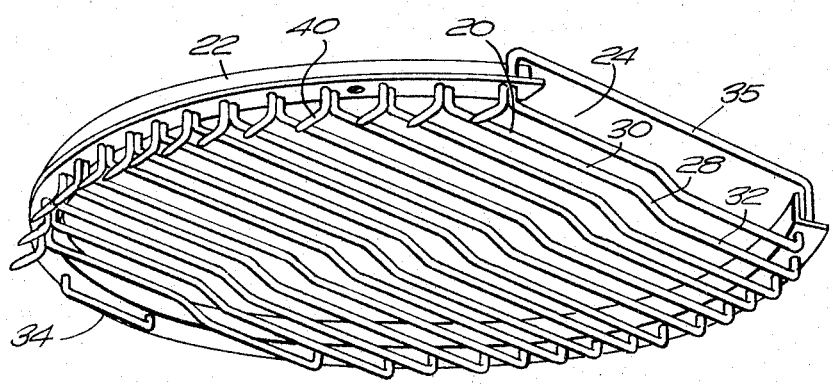
FIGURE 3 is a perspective view of the under side of the guard.
Figure 4:
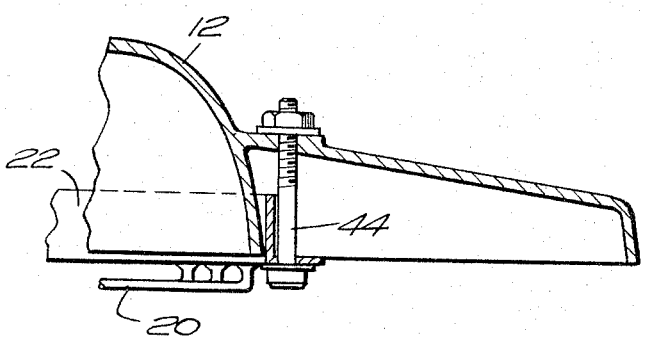
FIGURE 4 is a fragmentary sectional view, on a larger scale, of the housing and guard shown in FIGURE 1.

A typical rotary power lawn mower is illustrated in FIGURE 1, this mower having a motor housing 10 over a housing 12 for the blades which are connected to the motor by a vertical shaft (not shown). The housings are mounted on front wheels 14 and rear wheels 16 and a suitable handle 18 is provided to control and steer the mechanism. The blades whirl in a horizontal plane at high speed to cut the grass that comes under the housings, the cuttings being ejected to one side.

To reduce the possibility of articles coming into contact with the blades, a guard is mounted below the blades. As shown, the guard consists of a series of generally parallel bars 20 welded or otherwise secured at their ends to a circular frame member 22 which may be of angle iron. This member is not a complete circle, a gap 24 being left at the discharge side of the mower so as not to obstruct the discharge of grass cuttings from under the housings. The bars 20 are in a common horizontal plane and extend in the direction of movement of the mower, that is, in a front to rear direction, short vertical portions 26 being sharply bent at the ends from the main portion so that the bars will be at a slightly lower level than the frame 22.

The bars 20 are zigzag in shape, each having a small central portion 28 defined by reverse bends between it and two straight portions 30 and 32 which are approximately equal to each other. The spaces between the straight portions 32 of the bars 20 are offset from the spaces between the portions 30 of the bars, so that when the mower advances, any grass that is bent down by the forward portions 30 of the bars and consequently out of reach of the blades springs up between the rear portions 32 of the bars and is then cut. A short bar 34 which is not of zigzag shape is at the side of the machine opposite the discharge side.

At the discharge side of the housing 12 is an orifice (not shown) for the exit of the grass cuttings. This orifice is in part above the level of the frame member 22. To guard against an accidental insertion of an object into this orifice, a bar 35 is extended across it, spanning the gap 24 at a level above the member 22.

At the forward end of each of the bars 20 a finger 40 is welded or otherwise secured to the frame 22. These fingers project forward at or slightly below the level of the bars 20 and serve to pick up tangled and crooked grass so that it will extend up between the bars and be cut by the blades.

The frame 22 with its bars is removably secured to the housing 12 by any suitable means. As shown, bolt holes 42 are provided in the frame 22 to receive bolts 44 by which the frame is detachably secured to the housing.

I claim:

1. A guard for a rotary power lawn mower, comprising a circular frame member adapted to be mounted horizontally under a mower, a series of generally parallel bars secured to said frame member and disposed in a horizontal plane below that of the member, each said bar having approximately equal front and rear portions and a small central portion defined by reverse bends between it and the front and rear portions, said frame member having a gap at the discharge side of the mower.

2. A guard as described in claim 1, each said bar having at each end a short portion bent up to vertical, the extremity thereof being welded to said frame member.

3. A guard as described in claim 1, and a short rigid finger projecting forward from the forward end of each said bar.

4. A guard as described in claim 1, and an additional of said member.

References Cited by the Examiner

UNITED STATES PATENTS

| | | | |
|---|---|---|---|
| 2,934,882 | 5/1960 | Kaut | 56—255 |
| 3,038,289 | 6/1962 | Cross | 56—255 |
| 3,098,337 | 7/1963 | Teachworth | 56—25.4 |
| 3,148,490 | 9/1964 | Chadwick | 56—25.4 |

ABRAHAM G. STONE, *Primary Examiner.*

RUSSELL R. KINSEY, *Examiner.*